Sept. 24, 1963    K. W. BENHAM    3,104,738
PILASTER STRUCTURE AND HINGE BRACKET ASSEMBLY
Filed Feb. 26, 1959    5 Sheets-Sheet 1

INVENTOR.
KENT W. BENHAM
BY
*Reuben J. Carlson*
Attorney

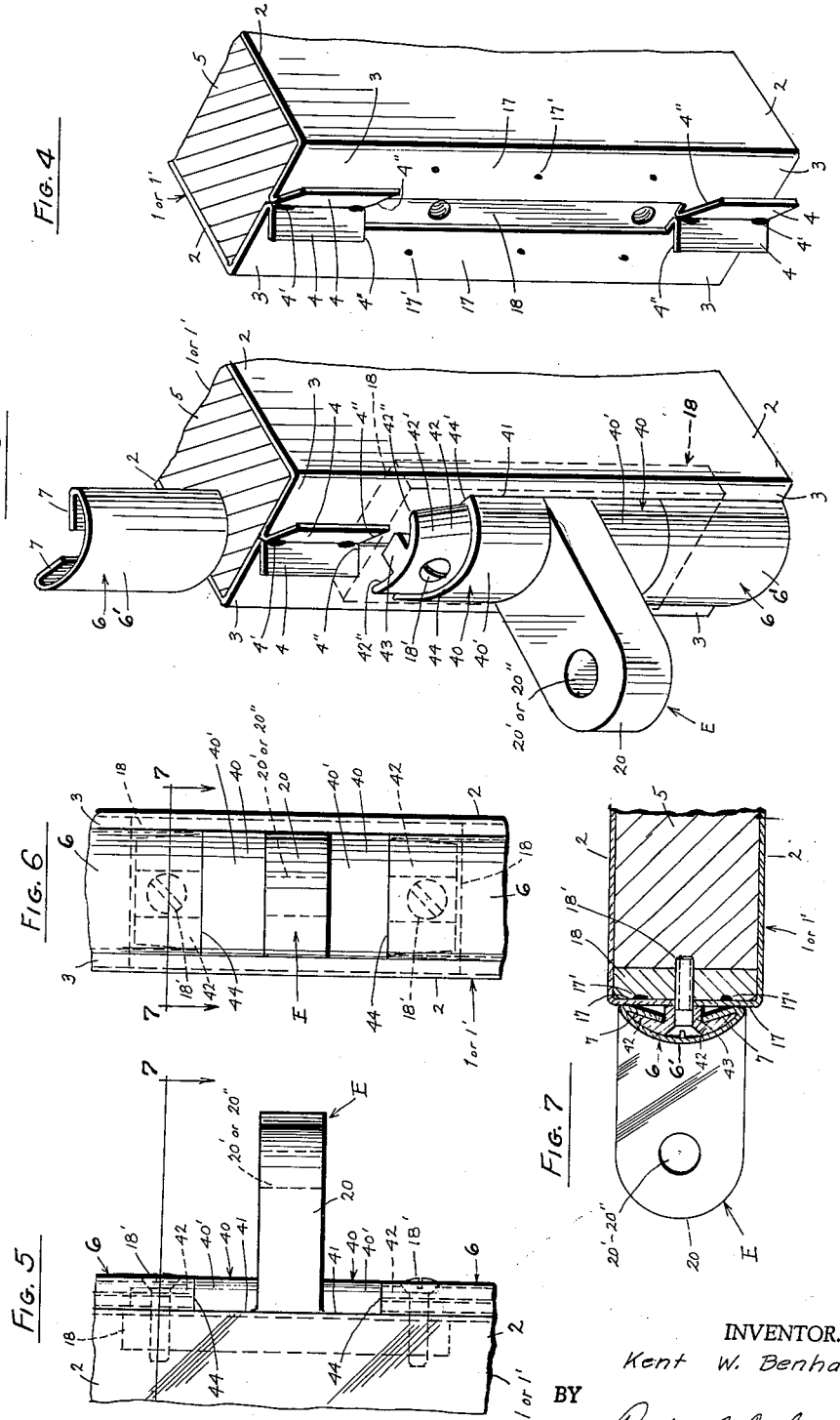

Sept. 24, 1963          K. W. BENHAM          3,104,738
PILASTER STRUCTURE AND HINGE BRACKET ASSEMBLY
Filed Feb. 26, 1959                    5 Sheets-Sheet 3
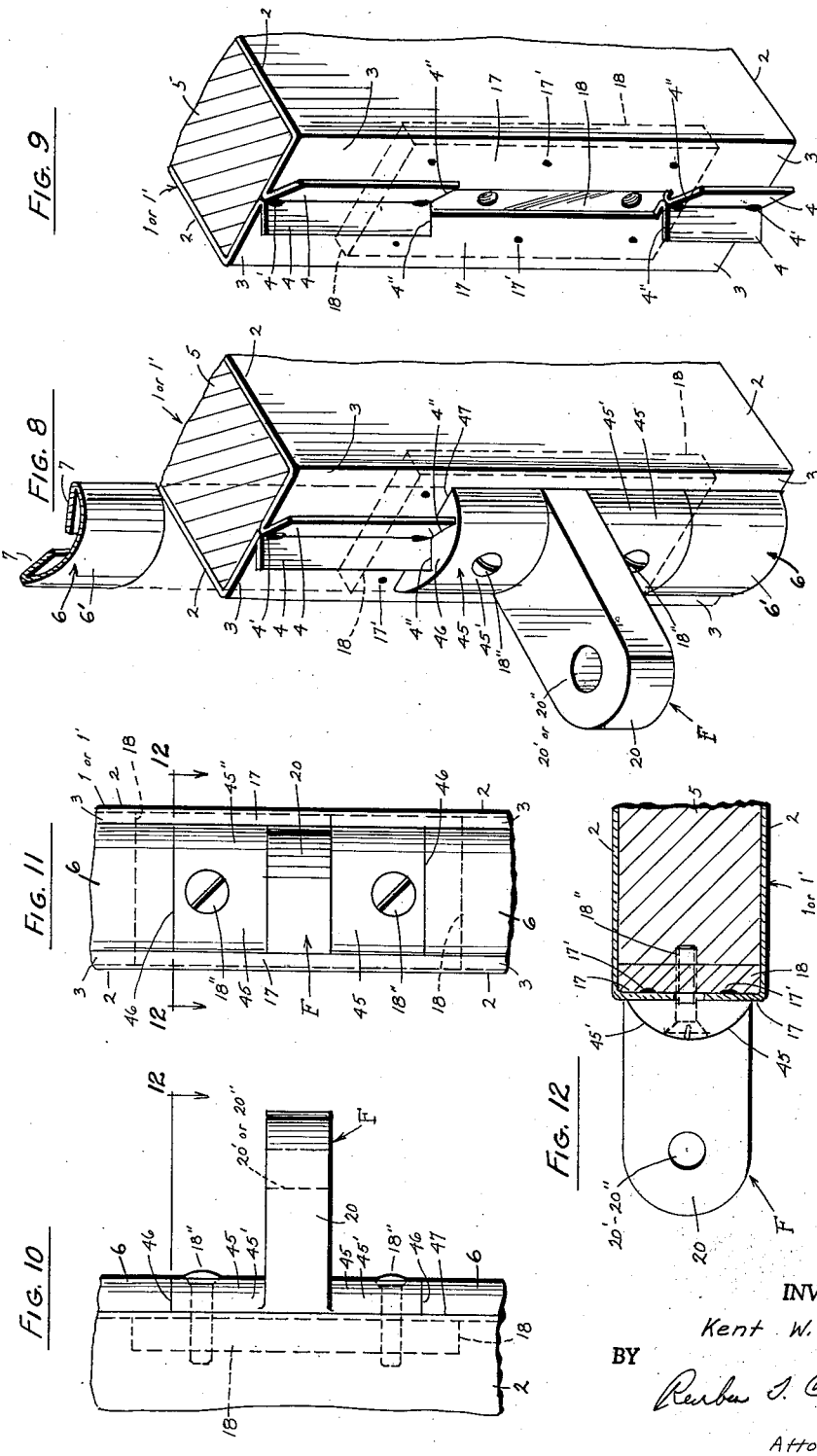
INVENTOR.
Kent W. Benham
BY
Reuben J. Carlson
Attorney Sept. 24, 1963 K. W. BENHAM 3,104,738
PILASTER STRUCTURE AND HINGE BRACKET ASSEMBLY
Filed Feb. 26, 1959 5 Sheets-Sheet 4
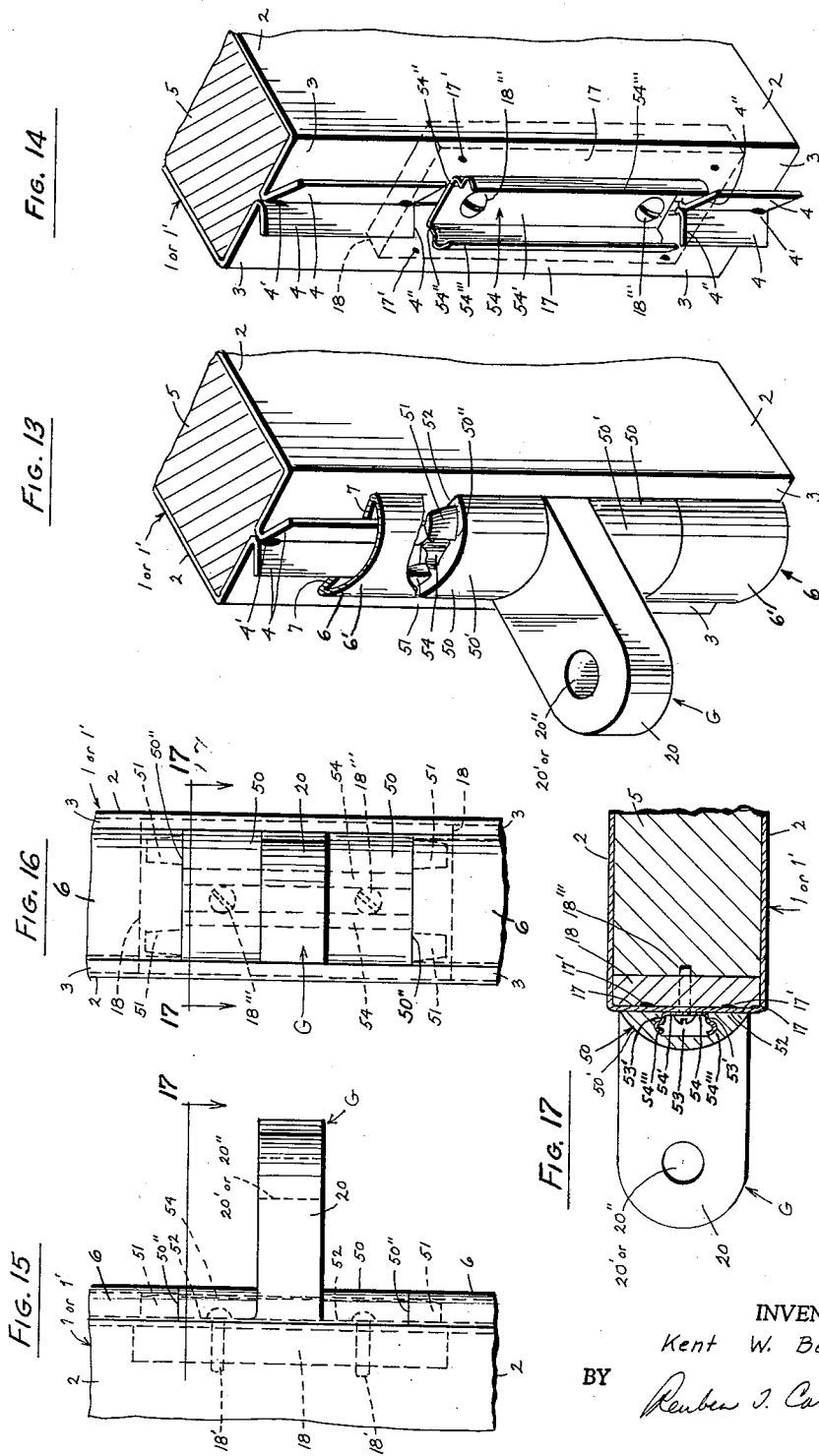
INVENTOR.
Kent W. Benham
BY Reuben J. Carlson
Attorney Sept. 24, 1963  K. W. BENHAM  3,104,738
PILASTER STRUCTURE AND HINGE BRACKET ASSEMBLY
Filed Feb. 26, 1959  5 Sheets-Sheet 5
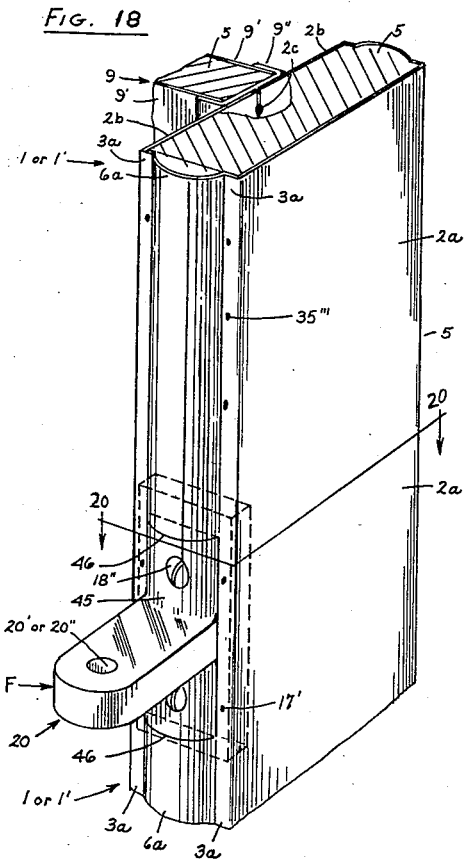
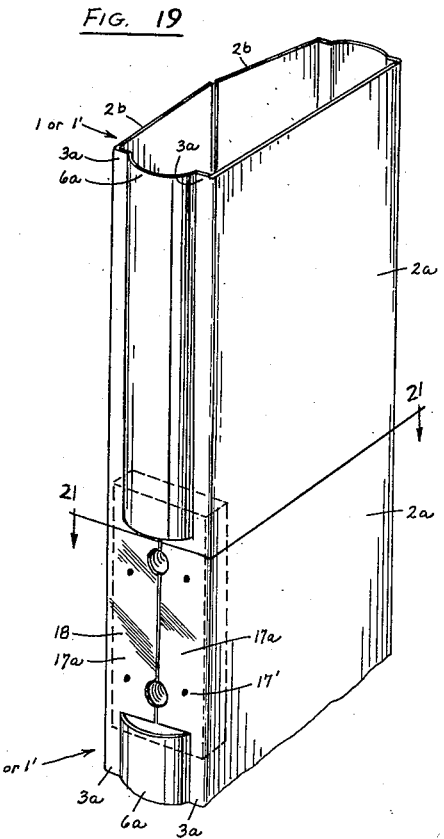
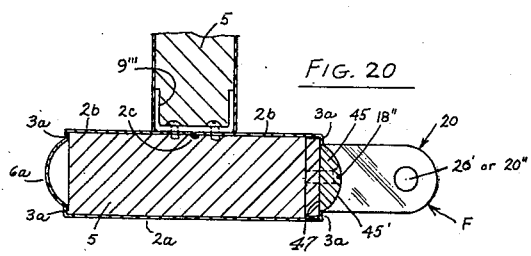
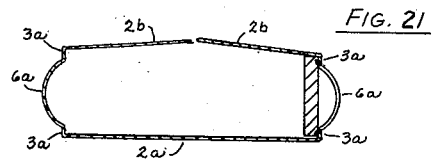
INVENTOR.
Kent W. Benham
BY
Reuben J. Carlsen
Attorney United States Patent Office 3,104,738
Patented Sept. 24, 1963

3,104,738
PILASTER STRUCTURE AND HINGE
BRACKET ASSEMBLY
Kent W. Benham, Gates Mills, Ohio, assignor to The Sanymetal Products Company, Inc., Cleveland, Ohio, a corporation of Ohio
Filed Feb. 26, 1959, Ser. No. 795,683
10 Claims. (Cl. 189—46)

This invention relates to improved pilaster structures and hinge bracket assemblies in which the door supporting hinge brackets are rigidly secured to the jamb edge of the pilaster in cantilever suspension and without attachment to the side faces of the pilaster. This application is a continuation-in-part of my copending application Serial No. 696,864, filed November 15, 1957, now U.S. Patent 2,876,874.

Hinge brackets made in accordance with this invention are particularly designed for cantilever attachment to frame structures, posts and pilasters whose jamb edge is of relatively narrow width, and are particularly designed for attachment to the jamb edge of hollow metal pilasters which measure only one to two inches or less in thickness, and which form the supporting uprights for interior cubicles, such as toilet and hospital cubicles, and the like.

A typical hollow metal pilaster with which the hinge brackets of this invention may be associated, may be formed by a pair of spaced metal facing sheets bonded to a reinforcing core of sound deadening insulation, and which present paired inturned flanges along the exposed vertical and horizontal edges thereof. The paired inturned flanges present a pair of outturned lip portions formed integral therewith and joined together by exteriorly applied spot welds to provide a rigid pilaster construction. Edging strips of semi-tubular cross section, and presenting a contoured facing portion and paired inturned lip portions, are telescoped over the outturned lip portions of the pilaster body to interlock therewith. The applied edging strips thus supply a finished appearance to the exposed vertical and horizontal edges of the pilaster.

When a dividing partition is to extend from the rear face of the pilaster, the relatively thin hollow metal pilaster may be shaped from a single metal sheet formed to present a front facing section, contoured jamb facing sections, and complementary rear facing sections whose vertical edges are secured together by spot welds, and the vertical seem as thus formed covered and concealed by the adjacent vertical edge of the dividing partition. Hinge bracket insert holes may be cut in the contoured jamb facing section, or a relatively flat seating face may be formed in the jamb edge to provide a seat for the rear face of the hinge bracket made in accordance with this invention.

The improved hinge brackets of this invention may be die cast or otherwise formed as integral units to present a laterally extending door supporting arm section on which the door is swingably mounted. These hinge brackets are designed to be mounted on the jamb edge of a relatively thin pilaster by means which engage or interlock with a jamb portion of the pilaster or with associated parts applied to or built into the pilaster during its manufacture. The hinge bracket includes an exterior body section from which the arm supporting section laterally extends, and the body section thereof is equipped with means to rigidly secure the same to a jamb edge seating face of the pilaster and between the terminal ends of the contoured jamb facing portions thereof, and with the exposed outer face of the bracket body section in contour symmetry with the outer faces of the contoured jamb facing portions of the pilaster.

The body section of the hinge bracket is rigidly fixed to a bracing member or plate positioned internally of the pilaster body and fixed to the inside face of the adjacent jamb section thereof in a manner to provide rigid support and securement for the hinge bracket, and with the adjacent terminal ends of the upper and lower contoured jamb facing portions of the pilaster in abutting relation to the upper and lower ends of the body section of the hinge bracket.

The terminal ends of the bracket body section may be equipped with one or more spaced tongues, wings or studs designed to telescope into the adjacent terminal ends of slidable jamb facing strips to thereby additionally secure the hinge bracket in rigid cantilever suspension from the jamb face of the pilaster body.

All forms of this invention feature hinge brackets which are in architectural symmetry and harmony with the adjacent contoured jamb facing sections of the pilaster body, and with the exposed portions of the hinge bracket confined to the jamb edge of the mounting pilaster. The laterally extending door supporting arm sections of these hinge brackets present a pintle hole formed to receive a hinge pintle associated with a bracket counterpart applied to either the upper portion or lower portion of the mounted door. By the use of these hinge brackets, the pilaster is not defaced by bracket side flanges which telescope over the sides of the pilaster and secured thereto by bolts or screws as heretofore used, but on the contrary, the exposed surfaces of these hinge brackets are contoured in blended symmetry with the jamb edge of the pilaster to provide a door supporting structure of architectural harmony and beauty.

These improved pilaster structures and hinge bracket assemblies are so constructed as to insure precise alignment of the upper and lower hinge brackets and accurate hanging of the door without field adjustment. These hinge brackets may be economically die cast or otherwise assembled as an integral unit at substantially less cost than door supporting hinge brackets heretofore made, can be attached to a floor supported or ceiling hung pilaster during manufacture thereof, and as mounted thereon, present an assembly which is substantially free of projections and crevices in which dirt would collect.

Other objects and advantages of this invention will become apparent as the disclosure proceeds.

Although the characteristic features of this invention are particularly pointed out in the claims, the invention itself, and the manner in which it is made and used, may be better understood by referring to the following description taken in connection with the accompanying drawings forming a part of this disclosure, and in which:

FIG. 3 is a perspective view of a door supporting hinge bracket and a fragmentary part of its supporting pilaster, as shown in FIGS. 1 and 2, this view showing the terminal end of one of the edging strips exploded from the hinge bracket and pilaster to reveal further details;

FIG. 4 is a fragmentary perspective view of the pilaster body which supports the hinge bracket shown in FIG. 3, and as the same would appear before this hinge bracket and the adjacent edging strips have been applied thereto;

FIG. 5 is a side elevational view of the hinge bracket shown in FIG. 3 and a fragmentary part of the pilaster to which it is applied, certain parts of the interior structure being shown in phantom lines;

FIG. 6 is an front elevational view of the hinge bracket shown in FIGS. 3 and 5, and a portion of the pilaster to which it is applied, certain interior parts thereof being shown in phantom lines; and FIG. 7 is a horizontal section of the hinge bracket and a portion of the pilaster to which it is attached, as the same would appear when viewed along line 7—7 of FIGS. 5 and 6.

Figure 1:
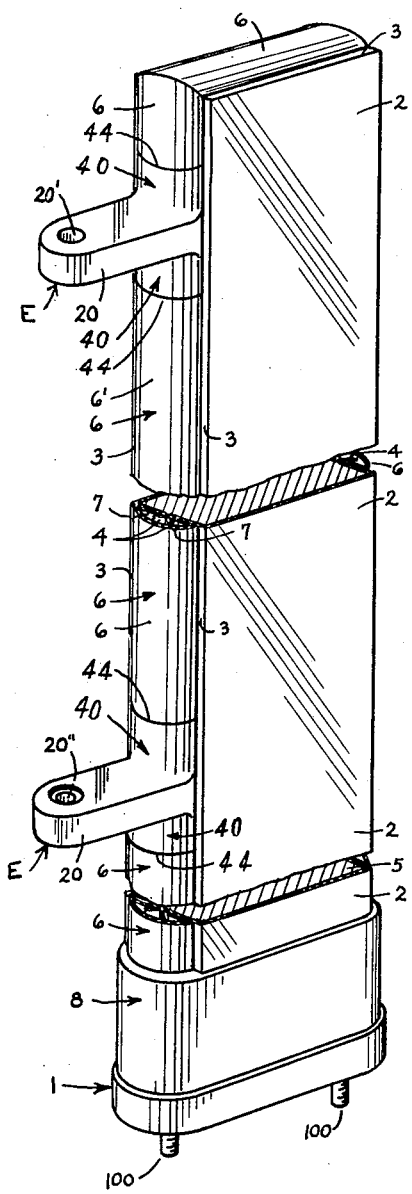
FIG. 1 is a perspective view of a floor supported pilaster having an upper and a lower hinge bracket made in accordance with this invention mounted on the jamb edge thereof.
Figure 2:
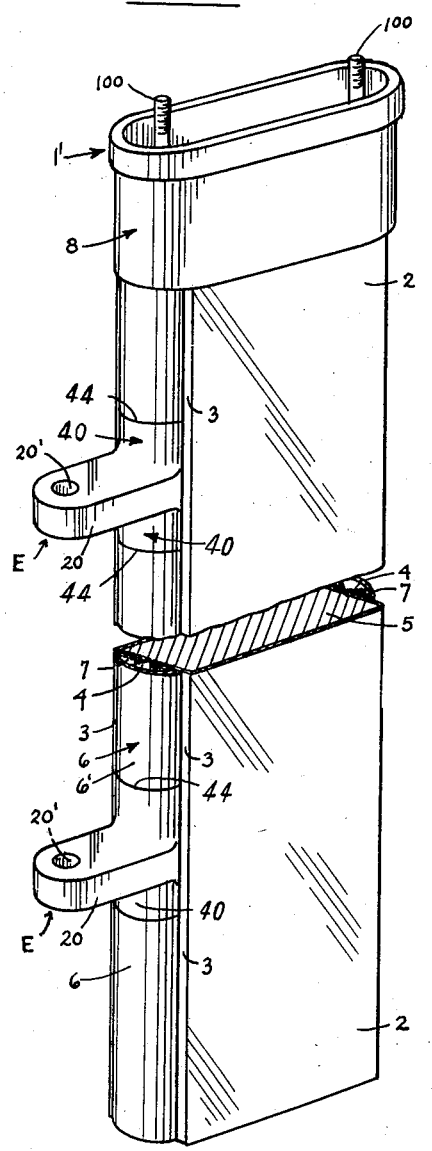
FIG. 2 is a perspective view of a ceiling supported pilaster having upper and lower hinge brackets made in accordance with this invention and mounted on the jamb edge thereof.

FIG. 8 is a perspective view of a modified form of door supporting hinge bracket and a fragmentary part of its supporting pilaster, this pilaster being generally similar in construction to those shown in FIGS. 1 and 2, but whose jamb edge has been modified to accommodate this hinge bracket, this view showing the terminal end of one of the edging strips exploded from the adjacent end of the body section of the hinge bracket to reveal further details;

FIG. 9 is a fragmentary perspective view of the pilaster body which supports the hinge bracket shown in FIG. 8, as the same would appear before this hinge bracket and the adjacent edging strips have been applied thereto;

FIG. 10 is a side elevational view of the hinge bracket shown in FIG. 8 and a fragmentary part of the pilaster to which it is applied, certain parts of the interior structure being shown in phantom lines;

FIG. 11 is a front elevational view of the hinge bracket shown in FIGS. 8 and 10 and a portion of the pilaster to which it is applied, certain interior parts thereof being shown in phantom lines; and FIG. 12 is a horizontal section of this hinge bracket and a portion of the pilaster to which it is attached, as the same would appear when viewed along line 12—12 of FIGS. 10 and 11.

FIG. 13 is a perspective view of a further modified form of door supporting hinge bracket and a fragmentary part of its supporting pilaster, this pilaster being generally constructed as indicated in FIGS. 1 and 2, but whose jamb edge has been modified to accommodate this hinge bracket, thish view showing only a fragmentary part of one of the edging strips to reveal further details;

FIG. 14 is a fragmentary perspective view of the pilaster body which supports the hinge bracket shown in FIG. 13, and as the same would appear when the interior bracing plate and the exterior bracket supporting snap fastener have been applied to the pilaster during manufacture thereof, but before application of the hinge bracket and adjacent edging strips;

FIG. 15 is a side elevational view of the bracket shown in FIG. 13 and a fragmentary part of the pilaster to which it is applied, certain parts of the interior structure being shown in phantom lines;

FIG. 16 is a front elevational view of the hinge bracket shown in FIGS. 13 and 15, and a portion of the pilaster to which it is applied, certain interior parts thereof being shown in phantom lines;

FIG. 17 is a horizontal section of the hinge bracket and a portion of the pilaster to which it is attached as the same would appear when viewed along line 17—17 of FIGS. 15 and 16.

FIG. 18 is a fragmentary perspective view of a pilaster formed from a tubular shaped metal sheet and having a bracket of the type shown in FIGS. 8 and 12 mounted on the jamb edge thereof;

FIG. 19 is a fragmentary perspective view of the hollow metal pilaster shown in FIG. 18 as the same would appear prior to the application of the hinge brackets thereto;

FIG. 20 is a transverse section taken along line 20—20 of FIG. 18; and

FIG. 21 is a transverse section taken along line 21—21 of FIG. 18.

Similar reference characters refer to similar parts throughout the several views of the drawings and the specification.

All of the door supporting hinge brackets constructed in accordance with this invention are particularly designed for attachment to the jamb edge of hollow metal posts or pilasters which may be either floor supported as shown in FIG. 1 or ceiling supported as shown in FIG. 2. These door supporting pilasters are particularly adapted for assembly into interior cubicles, such as hospital and toilet cubicles.

The floor supported pilaster 1 as shown in FIG. 1 and the ceiling hung pilaster 1' as shown in FIG. 2, and with which the door supporting hinge brackets of this invention are particularly adapted for attachment, comprise a pair of pilaster facing sheets 2—2 formed from sheet metal or other strong sheet material, which together present inturned flanges 3—3 along the exposed vertical and horizontal edges thereof. Each pair of inturned flanges 3—3 incorporate outturned lip portions 4 which are secured together by suitable spot welds 4' exteriorly applied to the paired outturned lip portions at the crotch area between them as shown in FIG. 4. Prior to spot welding together the paired inturned lip portions 4 to provide a rigid pilaster construction, a reinforcing and insulating core 5 is first adhesively bonded to the inside face of one of the pilaster facing sheets 2, and the exposed face of the reinforcing core is then coated with adhesive and the other facing sheet 2 then applied thereto. Pressure is then applied to the sandwich as thus formed to insure a firm adhesive bond between the reinforcing core 5 and the inside faces of the pilaster facing sheets 2—2. The reinforcing core 5 is desirably composed of a relatively hard, pilaster sheet bracing and sound deadening insulation packing, such as slabs of fibreglass, honeycomb fibreboard or other core material which is relatively light in weight, capable of deadening sound, and capable of bracing and supporting the pilaster facing sheets 2—2 to which the reinforcing core 5 is adhesively bonded.

The exposed vertical and horizontal edges of the pilasters 1—1' are trimmed by means of edging strips 6 of semi-circular cross-section and similar in size and contour. Each edging strip 6 presents a face portion 6' of generally curvilinear form which terminates in inturned lip portions 7. The edging strips 6 are designed to be telescoped longitudinally over the outturned lip portions 4 of the pilaster facing sheets 2—2, so that the inturned lip portions 7 of the edging strip will interlock with and be firmly secured to the outturned lip portions 4 of the pilaster facing sheets 2—2 as shown in FIGS. 1, 2, 4, 9 and 14.

During manufacture of the sheet metal panel facing sheets 2—2 of the pilasters 1 and 1', suitable cut-outs, deformations or additions may be made in or to those areas of the inturned flanges 3 and outturned lip portions 4 to which the door supporting hinge brackets of this invention are to be applied, to thereby provide suitable seating faces and anchoring means for rigidly securing the selected hinge bracket to the jamb edge thereof, as more fully hereafter explained. All of the hinge brackets of this invention are particularly designed to be applied to the prepared areas of the inturned flanges 3 of the panel facing sheets 2—2, either before the lip portions 4 of the panel facing sheets have been spot welded together, or after the reinforcing core 5 has been positioned between the panel facing sheets and the outturned lip portions 4 thereof welded together as heretofore explained.

The floor supported end of the pilaster 1 as shown in FIG. 1, and the ceiling supported end of the pilaster shown in FIG. 2, are suitably secured to the floor or ceiling wall by suitable brackets and lag bolts 100 as shown in FIG. 2. The floor or ceiling supported end of the pilaster and associated wall securing means, are concealed within a trimming shoe 8 as shown in FIGS. 1 and 2 which snugly telescopes over the pilaster and snugly seats against the horizontal building wall to which the end of the supported pilaster is attached.

The door supporting hinge bracket E shown in FIGS. 3, 5, 6 and 7 is designed to be mounted on the jamb face of a hollow metal pilaster 1 or 1' and to seat against the adjacent flange portions 17 of the inturned flanges 3 of the pilaster body as shown in FIG. 4. The hinge bracket E may be die cast as an integral unit to provide a door supporting arm section 20 extending laterally from a body section 40 which presents a curvilinear outer face 40' in contour conformity to the outer faces of the curvilinear facing portion 6' of the upper and lower edging strips 6 applied to the pilaster body. The hinge bracket E may be used as an upper hinge bracket, or a lower door supporting hinge bracket, by providing an appropriate pintle hole 20' therein to receive an upper door hinging pintle, or a pintle hole 20" therein which supports the lower pintle on which the door is swingably supported.

The body section 40 presents a relatively flat rear seating face 41 designed to flatly seat against the inturned flange portions 17 of the pilaster body. The hinge bracket E is rigidly held in mounted position by an internal bracing plate 18 which is positioned in abutting relation to the adjacent inside faces of the inturned flange portions 17 of the pilaster body and which is secured by spot welds 17' to the flange portions 17 during manufacture of the pilaster 1 or 1'.

The bracket body section 40 is provided with a tapered end wing section 42 extending from one or both ends thereof, and which presents a generally curvilinear outer face 42' which conforms to the inner face of the curvilinear facing portion 6' of the edging strip 6 as telescoped thereover. The curvilinear outer face 42' of each end wing section 42 defines with the adjacent end of the body section 40 an inset shoulder 44 against which the terminal end of the curvilinear facing portion 6' of the edging strip 6 is designed to abut.

Each end wing section 42 has a rear spacer rib 43 designed to seat against the adjacent inturned flange portions 17 of the pilaster body as shown in FIG. 3. Each end wing section 42 also presents rounded side edge portions 42" which are inwardly spaced from the plane of the rear seating face 41 of the body section to define an inset abutment shoulder 44' against which the terminal ends of the inturned lip portions 7 of the adjacent moulding strip 6 are designed to abut. When the hinge bracket E has been fully mounted on the pilaster body, the curvilinear outer face 40' of its body section is in straight line symmetry with the outer face of the curvilinear facing portions 6' of the upper and lower edging strips 6, with each end wing section 42 fully and snugly telescoped within the adjacent terminal end portion of the adjacent strip and between the inner face of its curvilinear facing portion 6' and the inner face of its inwardly extending lip portions 7.

In manufacturing the pilaster body 1 or 1' to receive and support one or more of the hinge brackets E, the inturned flanges 3 of the pilaster facing sheets 2—2 are formed to provide the usual outturned lip portions 4 above and below the area where the hinge bracket E is to be applied, leaving lipless inturned flange portions 17 therebetween which provide a flat seat for the rear face 41 of the bracket body section 40. A sturdy bracing plate 18 is positioned adjacent the inside face of the inturned flange portion 17 of one of the pilaster facing sheets 2 and secured by spot welds 17' thereto. After the reinforcing core 5 has been adhesively bonded to this pilaster facing sheet 2, the companion pilaster facing sheet 2 is applied and adhesively bonded to the opposite face of the reinforcing core 5. The adjacent outturned lip portions 4 are then secured together by the application of a series of spot welds 4' in the crotch therebetween as shown in FIG. 4. The terminal ends 4" of the existing lip portions 4 are sufficiently spaced to permit the application of the hinge bracket E to the inturned flange portions 17 therebetween. The inturned flange portion 17 of the second and companion pilaster facing sheet 2 may also be secured as by spot welds 17' to the underlying bracing plate 18.

The bracket body section 40 and associated end wing sections 42 thereof are then applied to the jamb face of the pilaster body and between the terminal ends 4" of the outturned lip portions 4 thereof as shown in FIG. 3, with the flat rear face 41 of the body section seated against the outside faces of the inturned flange portions 17 of the pilaster body. Sturdy securing screws 18', having sink heads are then inserted through an appropriately formed hole provided in each of the end wing sections 42, and are screwed into a tapped hole provided in the internal bracing plate 18. The upper and lower edge moulding strips 6 are then telescoped over the outwardly flared lip portions 4 of the pilaster body and the terminal ends thereof telescoped over the adjacent end wing sections 42 of the hinge bracket E, with the terminal ends of the curvilinear facing portion 6' and inturned lip portions 7' thereof driven into snug abutment against the adjacent outer shoulder 44 and inner shoulder 44' of the bracket body section 40.

When the hinge bracket E is thus mounted on the jamb face of the pilaster 1 or 1', the curvilinear face 40' of the bracket body section 40 will be in streamline symmetry with the outer curvilinear faces of the adjacent edging strips 6, with the bracket securing means completely concealed from exterior view.

The door supporting hinge bracket F shown in FIGS. 8, 10, 11 and 12 is designed to be mounted on the jamb face of a hollow metal pilaster 1 or 1' and to seat against the adjacent flange portions 17 of the inturned flanges 3 of the pilaster body as shown in FIG. 9. The hinge bracket F may be die cast as an integral unit to provide a door supporting arm section 20 extending from a body section 45 which presents a curvilinear outer face 45' in contour conformity to the outer faces of the curvilinear facing portions 6' of the upper and lower edging strips 6 applied to the pilaster body. The hinge bracket F may be used as an upper hinge bracket, or a lower door supporting hinge bracket, by providing a pintle hole 20' therein to receive an upper door hinging pintle, or a pintle hole 20" therein which supports a lower pintle on which the door is swingably supported.

The body section 45 presents square cut ends 46 and a rear seating face 47 designed to seat flatly against the inturned flange portions 17 of the pilaster body. The hinge bracket F is rigidly held in mounted position by an internal bracing plate 18 which is positioned in abutting relation to the adjacent inside faces of the inturned flange portions 17 of the pilaster body, and which is secured to the flange portions 17 by spot welds 17' during manufacture of the pilaster body.

In manufacturing the pilaster body 1 or 1' to support one or more of the hinge brackets F, the inturned flanges 3 of the pilaster facing sheets 2—2 are formed to provide the usual outturned lip portions 4 above and below the area where the hinge bracket F is to be applied, leaving lipless inturned flange portions 17 therebetween which provide a flat seat for the rear face 47 of the bracket body section 45. A sturdy bracing plate 18 is positioned adjacent the inside face of the inturned flange portion 17 of one of the pilaster facing sheets 2 and is secured as by spot welds 17' thereto. After the reinforcing core 5 has been adhesively bonded to this pilaster facing sheet 2, the companion pilaster facing sheet 2 is applied and adhesively bonded to the reinforcing core 5. The adjacent outturned lip portions 4 are then secured together by the application of a series of spot welds 4' in the crotch therebetween as shown in FIG. 9. The terminal ends 4" of the existing lip portions 4 are sufficiently spaced to permit the application of the body section 45 of the hinge bracket F to the inturned flange portions 17 therebetween. The inturned flange portion 17 of the second and companion pilaster facing sheet 2 may also be secured by spot welds 17' or screwed to the underlying bracing plate 18.

The bracket body section 45 is applied to the inturned flange portions 17 of the pilaster body and between the terminal ends 4" of the lip portions thereof as shown in FIG. 8, with the flat rear face 47 of the body section snugly seated against the outside faces of the inturned flange portions 17 of the pilaster body. A pair of sturdy securing screws 18", each having a sink head, is then inserted through appropriate holes extending through the bracket body section 45 and screwed into tapped holes provided in the internal bracing plate 18 as shown in FIG. 9. The upper and lower edge moulding strips 6 are then telescoped over the outwardly flared lip portions 4 of the pilaster body as indicated in FIG. 8, and the terminal ends thereof placed in abutting relation to the square cut ends 46 of the bracket body section 45.

The hinge bracket F as thus mounted on the jamb face of the pilaster 1 or 1', is rigidly secured to the jamb face of the pilaster, and presents the curvilinear outer face 45' of its body section 45 in streamline symmetry with the outer curvilinear faces of the adjacent edging strips 6.

The door supporting hinge bracket G shown in FIGS. 13, 15, 16 and 17, is designed to be mounted on the jamb face of the hollow metal pilaster 1 or 1' and to seat against the adjacent flange portions 17 of the pilaster body as shown in FIG. 14, and held thereto by a snap fastener in the form of a snap lock channel 54. The hinge bracket G may be die cast as an integral unit to provide a door supporting arm section 20 extending from a body section 50 which presents a curvilinear outer face 50' in contour conformity to the outer faces of the curvilinear face portions 6' of the upper and lower edging strips 6 applied to the pilaster body. The hinge bracket G may be used as an upper hinge bracket, or a lower door supporting hinge bracket, by providing a pintle hole 20' therein to receive an upper door hinging pintle, or a pintle hole 20" therein which supports a lower pintle on which the door is swingably supported.

The bracket body section 50 may present square cut ends 50" against which the terminal ends of the upper and lower edge moulding strips 6 are designed to abut, to thereby provide substantially flush and single line joints therebetween. The upper and lower ends of the body section 50 may also be provided with a tongue or a pair of spaced vertically extending studs 51 at one or both ends thereof which are designed to telescope into the adjacent end of the semi-tubular edge moulding strip 6.

The body section 50 also presents a pair of spaced rear facing portions 52 which define a vertically extending locking groove 53 therebetween, as shown in FIGS. 13 and 17. The locking groove 53 presents side ledge portions 53' designed to interlock with a snap-lock channel 54 which is first applied to the jamb face of the pilaster body as shown in FIG. 14. The spaced rear facing portions 52 of the bracket body section 50 are designed to flatly seat against the outside faces of the inturned flange portions 17 of the pilaster body when the bracket body section 50 has been pushed into locking relation with the snap-lock channel 54.

The snap-lock channel 54 presents a web portion 54' which seats against the outside faces of the inturned flange portions 17 of the pilaster body. The snap-lock channel 54 also presents side flanges 54" terminating in resilient curvilinear rim portions 54''' designed to snap into interlocking engagement with the side ledge portions 53' of the locking groove 53 formed in the rear face of the bracket body section 50. The web portion 54' of the snap-lock channel 54 is rigidly secured to an internal bracing plate 18 which seats against the inside faces of the inturned flange portions 17 of the pilaster body as shown in FIG. 14, and is secured thereto by suitable metal screws 18'''.

In manufacturing the pilasters 1 and 1' to support one or more of the hinge brackets G, the inturned flanges 3 of the pilaster facing sheets 2—2 are formed to provide the usual outturned lip portions 4 above and below the area where the hinge bracket G is to be applied, leaving lipless inturned flange portions 17 therebetween which provide a flat seat for the spaced seating portions 52 of the bracket body section 50. A sturdy bracing plate 18 is positioned adjacent the inside face of the inturned flange portion 17 of one of the pilaster facing sheets and secured as by spot welds 17' thereto. After the reinforcing core 5 has been adhesively bonded to this pilaster facing sheet 2, the companion pilaster facing sheet 2 is applied thereover and adhesively bonded to the adjacent face of the reinforcing core 5. The inturned lip portions 4 are then secured together by the application of a series of spot welds 4' in the crotch therebetween as shown in FIG. 14. The terminal ends 4''' of the existing lip portions 4 are sufficiently spaced to permit the application of the body section 45 of the hinge bracket G to the inturned flange portions 17 therebetween. The inturned flange portions 17 of the second and companion pilaster facing sheet 2 may also be spot welded or screwed to the underlying bracing plate 18. The snap-lock channel 54 is then placed in seating position against the outside faces of the flange portions 17, and rigidly held in position by two or more metal screws 18''' extending through the web portion 54' thereof and screwed into tapped holes provided in the internal reinforcing plate 18.

The bracket body section 50 is then applied by telescoping the locking groove 53 in the rear face thereof over the side flange portions 54" of the snap-lock channel 54 until the resilient curvilinear rim portions 54''' thereof snap into interlocking engagement with the side ledge portions 53' of the locking groove. The spaced rear facing portions 52 of the body section will then snugly seat against the outside faces of the inturned flange portions 17 of the pilaster body.

The upper and lower moulding strips 6 are then telescoped over the outwardly flared lip portions 4 of the pilaster body as indicated in FIG. 13, and the terminal ends thereof placed in abutting relation to the square cut ends 50" of the bracket body section 50, and with the locking studs 51 snugly telescoped into the adjacent terminal end portion of the semi-tubular edging strip 50.

The hinge bracket G is thus rigidly and securely mounted on the jamb face of the pilaster by the snap-lock channel 54 whose resilient curvilinear rim portions 54''' are in locking engagement with the side ledge portions 53' of the locking groove 53 extending vertically along the rear face of the bracket body section 50. This bracket is further braced by the spaced rear facing portions 52 extending along the locking groove 53, and which snugly seat against the outside faces of the inturned flange portions 17 of the pilaster body. The hinge bracket G may be further rigidly fixed to the jamb face of the pilaster body by the provision of tongues or studs 51 which project from the upper and lower ends of the bracket body section 50 and into the end of the adjacent semi-tubular edging strip 6, and with the three sides of each stud 51 in bracing relation to the inside faces of the curvilinear portion 6' and the inturned lip portion 7 of the edging strip 6, and the face or edge of the adjacent lip portion 4 of the pilaster.

As thus assembled, the curvilinear outer face 50' of the bracket body section 50 is in streamlined symmetry with the outer curvilinear faces of the applied edging strips 6, with no bracket securing means exteriorly visible when the hinge bracket G is fully assembled on its supporting pilaster.

Some of the hinge brackets made in accordance with this invention, are provided with studs, wings or tongues which project from the ends of the body section and are designed to interlock with the adjacent terminal ends of jamb edge mouldings, such as the hinge bracket E shown in FIGS. 3 and hinge bracket G shown in FIG. 13. These hinge brackets normally require a pilaster equipped with slidable edge moulding strips which may be slidably telescoped over the end studs, end wings or end tongues projecting from the ends of the bracket body section.

However, where the hinge bracket presents square cut upper and lower ends which have no end projections, such as the bracket F shown in FIG. 8, the pilaster body need not be equipped with slidable moulding strips, but its jamb face may be provided with fixed or integral moulding portions of desired contour. Hinge brackets having square cut ends with no end projections, may be applied to posts having a jamb face of relatively narrow width, such as the pilaster shown for purposes of illustration in FIGS. 18–21, and which may be formed from a single metal sheet bent to provide a front side wall facing section 2a integrally joined to jamb face sections which in turn are integrally joined to complementary rear side facing sections 2b—2b whose adjacent abutting ends may be secured together as by spot or seam welds 2c. The relatively narrow jamb facing sections may be given any desired contour, and as shown for purposes of illustration in FIGS. 18–21, each jamb facing section may be shaped to present a pair of jamb ledge portions 3a integrally joined to an intermediate moulding portion 6a which may be contoured in harmony with the exposed outer face of the hinge bracket to be applied thereto.

During manufacture of a post or pilaster formed from a single strip of sheet metal as shown in FIGS. 18–19, to provide support for the hinge bracket F, the jamb edge of this pilaster may be formed to provide a seat for the flat rear face 47 of the body section 45 of the hinge bracket F, by providing two transverse cuts in the moulded portion 6a to provide a longitudinal slit, and then bending the adjacent metal flaps inwardly as shown in FIG. 19 to provide coplanar flange portions 17a—17a which provide a flat seat for the rear seating face 47 of the bracket body section 45. It will be appreciated that the transverse cuts as shown in FIG. 19 are so spaced that the adjacent terminal ends of the upper and lower moulding portions 6a will snugly abut the adjacent square cut ends 46 of the bracket body section 45 to provide substantially flush and single line joints therebetween.

In cases where a hinge bracket is to be applied to the pilaster which has a contoured body section and square cut ends without end projections, such as the hinge bracket F, an internal bracing plate 18 is inserted into the open end of this sheet metal pilaster and placed in abutting position against the inside faces of the inturned complementary flange portions 17a—17a, and there held by a suitable jig or support bar over which the hollow metal pilaster is telescoped. Spot welds 17' are then applied to the complementary flange portions 17a and the bracing plate 18. A reinforcing core 5, coated with a suitable adhesive, may then be telescoped through one of the open ends of the pilaster. The rear seating face 47 of the bracket body section 45 may then be placed in seating position against the outer face of the complementary inturned flange portions 17a—17a, and the hinge bracket F secured in position as by the application of securing screws 18'' which extend through the body section 45 and are threaded into threaded holes provided in the internal bracing plate 18.

It will also be appreciated that a bracket of the type similar to type G shown in FIG. 13, may also be applied to a pilaster having fixed jamb face moulding portions 6a as shown in the lower part of FIG. 19, by eliminating the end studs 51 from the body section 50 of the hinge bracket G to thereby provide square cut ends, and by securing the snap lock channel 54 as by metal screws 18''' to the bracing plate 18 as shown in FIG. 19, and with the spaced rear face portions 52 of the bracket body section 50 seating against the complementary inturned flange portions 17a—17a of this pilaster.

Pilasters having fixed jamb face mouldings and shaped from a single metal sheet, can be advantageously used in installations where the longitudinally extending joint as defined between the vertical edges of the complementary rear side face sections 2b—2b, can be covered as by the vertical edge of a dividing partition as shown in FIGS. 18 and 20. Such dividing partitions 9 are commonly used in the construction of toilet and compartment cubicles, and comprise a pair of spaced metal facing sheets 9' having a reinforcing core 5 sandwiched therebetween and adhesively secured thereto. The adjacent vertical edge of such dividing partitions 9 may be telescoped into an external moulding channel 9'', as shown in FIG. 18, which is secured as by suitable screws to the rear face of the pilaster to thereby conceal the joint in the rear side wall face thereof. Alternatively, the adjacent vertical edge of the dividing partition panel 9 may be telescoped over an internal securing channel 9''', as shown in FIG. 20, secured to the adjacent rear side face of the pilaster, and which conceals the vertical joint as defined between the adjacent vertical edges of the complementary rear side facing sections 2b—2b thereof.

It will be appreciated by those skilled in the art, that certain parts associated with one or more of the hinge brackets of this invention may be interchangeably applied and substituted for corresponding parts of other hinge brackets as above disclosed. For example, the insert studs 51 associated with the bracket G as shown in FIG. 13, may be substituted for the wing sections 42 of the hinge bracket E shown in FIG. 3, or applied to the upper and lower ends of the body section 45 of the hinge bracket F shown in FIG. 8.

Similarly, one or more of the wing sections 42 associated with the hinge bracket E shown in FIG. 3, may be alternatively applied to the ends of the body section of the hinge brackets F and G as is evident to those skilled in the art.

It will be particularly noted that all of the hinge brackets of this invention are directly supported from the jamb portion of a pilaster body, and do not overlap the side panel facing sheets of the pilaster body, and are particularly designed to be rigidly secured to the jamb edge portion of relatively thin pilaster bodies which may measure only one inch in thickness. The door supporting hinge and pilaster structures of this invention present an assembly wherein the exterior faces of the hinge brackets are in contoured symmetry with the exposed faces of the pilaster edge moulding strips 6 or the contoured jamb facing portions 3a and 6a thereof, and as assembled, present fine line butt joints therebetween which are scarcely discernible, and wherein the hinge bracket is securely locked and held in fixed position by a locking plate or member 18 positioned within the pilaster body.

Pilaster structures and hinge bracket assemblies made in accordance with this invention feature the elimination of bracket side flanges and other projections heretofore used to secure the hinge bracket to the pilaster, and which provide areas for the collection of dirt and foreign matter which cannot be readily removed. The hinge brackets of this invention can be cast or formed in one piece, at substantially less cost than door supporting hinge brackets heretofore made and used, and can be mounted on the jamb edge of the pilaster at the factory in precise door supporting alignment, and with less labor and less cost than the pilaster and hinge bracket assemblies heretofore made and used. The necessary modifications to the jamb edge of the pilaster bodies can be accomplished in accordance with this invention at minimum cost when cutting and fabricating the panel facing sheets, or during assembly of the pilaster body.

While certain novel features of this invention have been disclosed herein and are pointed out in the claims, it will be understood that various omissions, substitutions, and changes may be made by those skilled in the art without departing from the spirit of this invention.

What is claimed is:

1. A door supporting assembly including in combination, a hollow metal pilaster presenting a jamb portion and a hinge bracket supported in cantilever suspension from said jamb portion, said pilaster being formed by a pair of spaced sheet metal panels having a reinforcing core sandwiched therebetween, and a pair of inturned flanges extending inwardly from said sheet metal panels and presenting a first pair of outwardly flared lip portions which terminate adjacent the upper end of said jamb portion and a second pair of outwardly flared lip portions terminating adjacent the lower end of said jamb portion; and a reinforcing member positioned within said hollow metal pilaster and presenting a face thereof in abutting relation to the inside face of the inturned flanges of the pilaster at the jamb portion thereof; the inturned flanges of the pilaster adjacent the hinge bracket including a body section presenting a contoured front face and relatively flat rear face, a door supporting arm projecting from the contoured front face of said body section, and a tongue section projecting from each end of said body section and presenting a convex outer face terminating in longitudinally extending side edge portions, and a bracing rib extending rearwardly from said tongue section and in spaced relation between said side edge portions, the base end of said convey outer face and said side edge portions being inset with respect to the outer and rear faces of the body section whereby said body section presents adjacent outer and inner abutment shoulders, and means for securing said tongue sections to said internal reinforcing member; an upper semi-tubular edging strip and a lower semi-tubular edging strip each presenting a curvilinear shaped facing portion terminating in inturned lip portions, said upper and lower edging strips telescoping over and interlocking with the adjacent outwardly flared lip portions of the pilaster with the terminal ends of the respective upper and lower edging strips in abutting relation to the adjacent inner and outer shoulders of the body section of said hinge bracket, and with the projecting tongue sections of said body section telescoping into the adjacent terminal ends of said semi-tubular edging strips and between the curvilinear facing portion and the inturned lip portions thereof; the front face of the body section of said hinge bracket being substantially flush with the exterior face of said edging strips.

2. A door supporting pilaster and hinge bracket assembly including in combination; a generally tubular door supporting pilaster having means at one end thereof for securing the same to a horizontal building wall, said tubular pilaster presenting a pair of spaced side wall facing sections joined by a relatively narrow jamb edge section, said jamb edge section presenting a pair of spaced corner forming flange portions integral with and extending inwardly in substantially planar alignment from said side wall facing sections, and an intermediate contoured jamb edge portion extending between and connecting said spaced corner forming flange portions; a door supporting arm projecting forwardly from said jamb edge section and whose side faces are confined within the planes of said spaced side wall facing sections, a bracing member contained within said tubular pilaster and extending between and in substantially abutting relation to the inside faces of said spaced side wall sections and positioned in bracing relation against the inside faces of the inturned corner forming flange portions of the pilaster, and means for securing said door supporting arm to said bracing member so that said door supporting arm is fixedly mounted on the jamb edge section of the pilaster.

3. A door supporting pilaster and hinge bracket assembly including in combination; a generally tubular door supporting pilaster having means at one end thereof for securing the same to a horizontal building wall, said tubular pilaster presenting a pair of spaced side wall facing sections joined by a relatively narrow jamb edge section, said jamb edge section presenting a pair of spaced corner forming flange portions integral with and extending inwardly in substantially planar alignment from said side wall facing sections, and a pair of spaced upper and lower intermediate jamb edge portions each having an outbowed contour and each extending between and connected to the adjacently paired corner forming flange portions of the pilaster; a hinge bracket having a body section extending between the adjacent terminal ends of said upper and lower intermediate jamb edge portions and seating against the adjacent corner forming flange portions of the pilaster, a door supporting arm section fixed to and projecting forwardly from the contoured front face of said body section, a separate bracing member contained within said tubular pilaster and extending transversely between and in substantially abutting relation to the inside faces of said spaced side wall sections and positioned in bracing relation against the inside faces of the adjacent inturned corner forming flange portions of the pilaster, and means for securing said body section to said bracing member contained within the pilaster and whereby said hinge bracket is rigidly mounted on the jamb edge section of the pilaster.

4. A door supporting pilaster and hinge bracket assembly including in combination; a generally tubular door supporting pilaster having means at one end thereof for securing the same to a horizontal building wall, said tubular pilaster presenting a pair of spaced side wall facing sections joined by a relatively narrow jamb edge section, said jamb edge section presenting a pair of spaced corner forming flange portions integral with and extending inwardly in substantially planar alignment from said side wall facing sections, and a pair of spaced upper and lower intermediate jamb edge portions each having an outbowed contour and each extending between and connected to the adjacently paired corner forming flange portions of the pilaster; a hinge bracket having a body section extending between the adjacent terminal ends of said upper and lower intermediate jamb edge portions and seating against the adjacent corner forming flange portions of the pilaster, a door supporting arm section fixed to and projecting forwardly from the contoured front face of said body section, a separate bracing member contained within said tubular pilaster and extending transversely between and in substantially abutting relation to the inside faces of said spaced side wall sections and positioned in bracing relation against the inside faces of the adjacent inturned corner forming flange portions of the pilaster, and concealed means for securing said body section to said bracing member contained within the pilaster and whereby said hinge bracket is rigidly mounted on the jamb edge section of the pilaster.

5. A door supporting pilaster and hinge bracket assembly including in combination; a generally tubular door supporting pilaster having means at one end thereof for securing the same to a horizontal building wall, said tubular pilaster presenting a pair of spaced side wall facing sections joined by a relatively narrow jamb edge section, said jamb edge section presenting a pair of spaced corner forming flange portions integral with and extending inwardly in substantially planar alignment from said side wall facing sections, and a pair of spaced upper and lower intermediate jamb edge portions each having an outbowed contour and each extending between and connected to the adjacently paired corner forming flange portions of the pilaster; a hinge bracket having a body section extending between the adjacent terminal ends of said upper and lower intermediate jamb edge portions and seating against the adjacent corner forming flange portions of the pilaster, a door supporting arm section fixed to and projecting forwardly from the contoured front face of said body section, a separate bracing member contained within said tubular pilaster and extending transversely between and in substantially abutting relation to the inside faces of said spaced side wall sections and positioned in bracing relation against the inside faces of the adjacent inturned corner forming flange portions of the pilaster, and means for securing said body section to said bracing member contained within the pilaster and whereby said hinge bracket is rigidly mounted on the jamb edge section of the pilaster, said means including a bolt extending through said body section and a threaded shank portion projecting through a threaded hole in said bracing member and whereby said bolt may be manipulated to firmly clamp the hinge bracket to the jamb edge section of the pilaster.

6. A door supporting pilaster and hinge bracket assembly including in combination; a generally tubular door supporting pilaster having means at one end thereof for securing the same to a horizontal building wall, said tubular pilaster presenting a pair of spaced side wall facing sections joined by a relatively narrow jamb edge section, said jamb edge section presenting a pair of spaced corner forming flange portions integral with and extending inwardly in substantially planar alignment from said side wall facing sections, and a pair of spaced upper and lower intermediate jamb edge portions each having an outbowed contour and each extending between and connected to the adjacently paired corner forming flange portions of the pilaster; a hinge bracket having a body section extending between the adjacent terminal ends of said upper and lower intermedate jamb edge portions and seating against the adjacent corner forming flange portions of the pilaster, a door supporting arm section fixed to and projecting forwardly from the contoured front face of said body section, a separate bracing member contained within said tubular pilaster and extending transversely between and in substantially abutting relation to the inside faces of said spaced side wall sections and positioned in bracing relation against the inside faces of the adjacent inturned corner forming flange portions of the pilaster, and means for firmly securing said hinge bracket to said bracing member contained within the pilaster, said means having a manipulating head countersunk into the bracket body section, a shank portion extending through a bore in said body section, and a threaded shank extension projecting through a threaded hole in said bracing member and whereby said bolt head may be externally manipulated to firmly clamp the hinge bracket to the jamb edge section of the pilaster.

7. A door supporting pilaster and hinge bracket assembly including in combination; a generally tubular door supporting pilaster having means at one end thereof for securing the same to a horizontal building wall, said tubular pilaster presenting a pair of spaced side wall facing sections joined by a relatively narrow jamb edge section, said jamb edge section presenting a pair of corner forming flange portions integral with and extending inwardly in substantially planar alignment from said wall facing sections, and an intermediate jamb edge portion of outbowed contour extending between and connecting said spaced corner forming flange portions; a hinge bracket including a body section mounted on the jamb edge section of the pilaster, a door supporting arm section fixed to and projecting from the contoured front face of said body section, a separate bracing member contained within said tubular pilaster and extending transversely between and substantially in abutting relation to the inside faces of said spaced side wall sections and positioned in bracing relation against the inside faces of the inturned corner forming flange portions of the pilaster, and means for firmly securing said hinge bracket to said bracing member contained within the pilaster, said means having a manipulating head countersunk into said body section, a shank portion extending through a bore in said body section, and a threaded shank extension projecting through a threaded hole in said bracing member and whereby said bolt head may be externally manipulated to firmly clamp the hinge bracket to the jamb edge section of the pilaster.

8. A door supporting pilaster and hinge bracket assembly including in combination; a generally tubular door supporting pilaster having means at one end thereof for securing the same to a horizontal building wall, said tubular pilaster presenting a pair of spaced side wall facing sections joined by a relatively narrow jamb edge section, said jamb edge section presenting a pair of corner forming flange portions integral with and extending inwardly in substantially planar alignment from said wall facing sections, and a pair of spaced upper and lower intermediate jamb edge portions each having an outbowed contour and each extending between and connected to the adjacently paired corner forming flange portions of the pilaster, said flange portions presenting a pair of connecting extensions substantially in planar alignment and extending between the terminal ends of said intermediate upper and lower jamb edge portions; a hinge bracket including a body section and a door supporting arm section fixed to and projecting from said body section, said body section presenting an arcuately contoured front face, end faces substantially in abutting relation to the terminal ends of the intermediate upper and lower jamb edge portions of the pilaster, and a rear face seating against the outside faces of the aligned connecting extensions of said corner forming flange portions of the pilaster, a separate bracing member contained within said tubular pilaster and extending transversely between the inside faces of said side wall sections and positioned in bracing relation against the inside faces of the end extensions of the inturned corner forming flange portions of the pilaster; and means for securing the body section of said hinge bracket to said bracing member contained within the pilaster.

9. A door supporting pilaster and hinge bracket including in combination; a generally tubular door supporting pilaster having means at one end thereof for securing the same to a horizontal building wall, said tubular pilaster presenting a pair of spaced side wall facing sections joined by a relatively narrow jamb edge section, said jamb edge section presenting a pair of spaced corner forming flange portions integral with and extending inwardly in substantially planar alignment from said wall facing sections, and an intermediate outbowed jamb edge portion extending between and connecting said spaced corner forming flange portions, said corner forming flange portions presenting a pair of coplanar extensions projecting beyond the terminal end of said intermediate jamb edge portion; a hinge bracket including a body section having a rear face seating against said co-planar flange extensions, an end face in abutting relation to the terminal end of said intermediate jamb edge portion, a door supporting arm projecting forwardly from the front face of said body section, a tongue section projecting from said end face of the body section and extending into the intermediate jamb portion of the pilaster, a separate bracing member contained within the pilaster and positioned in bracing relation against the inside faces of said planar flange extensions, and means having a manipulating head countersunk in said tongue section, a shank portion extending through a bore in said tongue section, and a threaded shank extension projecting through a threaded hole in said bracing member and whereby said hinge bracket is firmly clamped to the jamb edge section of the pilaster.

10. A door supporting assembly including in combination, a hollow metal pilaster presenting a jamb portion and a hinge bracket supported in cantilever suspension from said jamb portion, said pilaster being formed by a pair of spaced sheet metal panels, a pair of inturned flanges extending inwardly from said sheet metal panels and presenting a pair of outwardly flared lip portions which terminate adjacent one end of said jamb portion, and a reinforcing member positioned within said hollow metal pilaster and presenting a face thereof in abutting relation to the inside faces of said inturned flanges adjacent the jamb portion of the pilaster; said hinge bracket including a body section presenting a contoured front face and relatively flat rear face, a door supporting arm projecting from the contoured front face of said body section, and a tongue section projecting from an end of said body section and presenting a convex outer face terminating in longitudinally extending side edge portions, and a bracing rib extending rearwardly from said tongue section and in spaced relation between said side edge portions, the base end of said convex outer face and said side edge portions being inset with respect to the outer and rear faces of the body section whereby said body section presents adjacent outer and inner abutment shoulders, and means for securing said tongue section to said internal reinforcing member; a semi-tubular edging strip presenting a curvilinear facing portion terminating in inturned lip portions, said edging strip telescoping over and interlocking with the adjacent outwardly flared lip portions of the pilaster with the terminal end of the edging strip in abutting relation to the adjacent inner and outer shoulders of the body section of said hinge bracket, and with the projecting tongue section of said body section telescoping into the adjacent terminal end of said semi-tubular edging strip and between the curvilinear facing portion and the inturned lip portions thereof.

References Cited in the file of this patent
UNITED STATES PATENTS

| | | |
|---|---|---|
| 1,841,670 | Parker | Jan. 19, 1932 |
| 2,570,519 | Burgess | Oct. 9, 1951 |
| 2,747,238 | Jones et al. | May 29, 1956 |
| 2,776,029 | Hult | Jan. 1, 1957 |
| 2,876,874 | Benham | Mar. 10, 1959 |